Aug. 15, 1933.          D. N. HAPKINS                    1,922,363
                         ROTARY ENGINE
                     Filed Jan. 10, 1930          2 Sheets-Sheet 1

Inventor.
Dimitri N. Hapkins

Attorney.

Aug. 15, 1933.     D. N. HAPKINS     1,922,363
ROTARY ENGINE
Filed Jan. 10, 1930     2 Sheets-Sheet 2

Inventor
Dimitri N. Hapkins

Attorney.

Patented Aug. 15, 1933

1,922,363

UNITED STATES PATENT OFFICE 1,922,363

ROTARY ENGINE

Dimitri N. Hapkins, Los Angeles, Calif., assignor of twenty per cent to Margaret A. Kerr, Los Angeles, Calif. and ten per cent to Clarence L. Kincaid, Los Angeles, Calif.

Application January 10, 1930. Serial No. 419,843

7 Claims. (Cl. 123—16)

This invention has reference to internal combustion engines of the rotary type, in which compression and firing of the fuel charges takes place in peripheral spaces between a rotor and the rotor casing, the elements corresponding to pistons, comprising radially movable blades or abutments carried on the rotor. It is a general purpose of the invention to provide a rotary engine of comparatively few and simply constructed parts, to the end that deterioration and destructive wear of the parts, and other difficulties commonly encountered in engines of this type, are reduced to a minimum. It is also a purpose of the invention to provide an engine capable of highly efficient performance and of developing great power in proportion to its size, due in part to its being adapted to operate under unusually high compression.

The present engine may be described generally as comprising a casing within which is a rotor carrying a plurality of radially movable blades which are urged into engagement with the inner peripheral wall of the casing. The latter has predetermined clearances from the rotor to provide separate compression and expansion spaces, into the former of which the fuel charge is drawn in and compressed by alternate rotor blades, the other blades being held in retracted positions from the wall of the casing so as to enable the charge to be taken into the compression space between alternate instead of successive blades. The fuel charge thus is compressed into one of a number of peripheral chambers formed in the rotor between alternate blades, and is then transferred past an abutment formed by the casing between the compression and expansion spaces, into the latter space, wherein firing of the charge occurs. As the charge is carried past the abutment, however, the intermediate rotor blade held in retracted position during compression of the charge, is released so as to cause the charge to become confined during firing and expansion, between successive blades and within the rotor chamber in which it was transferred from the compression to the expansion space. Thus provision is made for admitting full charges of relatively large volume into the engine and for compressing each charge into a space of considerably less volume, with the result that the engine possesses relatively high efficiency as later described herein.

It may be mentioned that the construction of the present type of engine is in certain respects similar to that of a pump comprising the subject matter of my copending application on rotary pump Ser. No. 419,842 filed January 10th, 1930, and therefore that in certain of its aspects and details, the invention is not necessarily limited to rotary engines, but may apply to other mechanisms of this general character, such as pumps, compressors, and the like.

Having set forth certain of the general characteristics of my invention, I will now proceed to a detailed description thereof, from which the above and further details and objects of the invention will be most clearly and readily understood, reference being had throughout the description to the accompanying drawings, in which.

Figure 1:
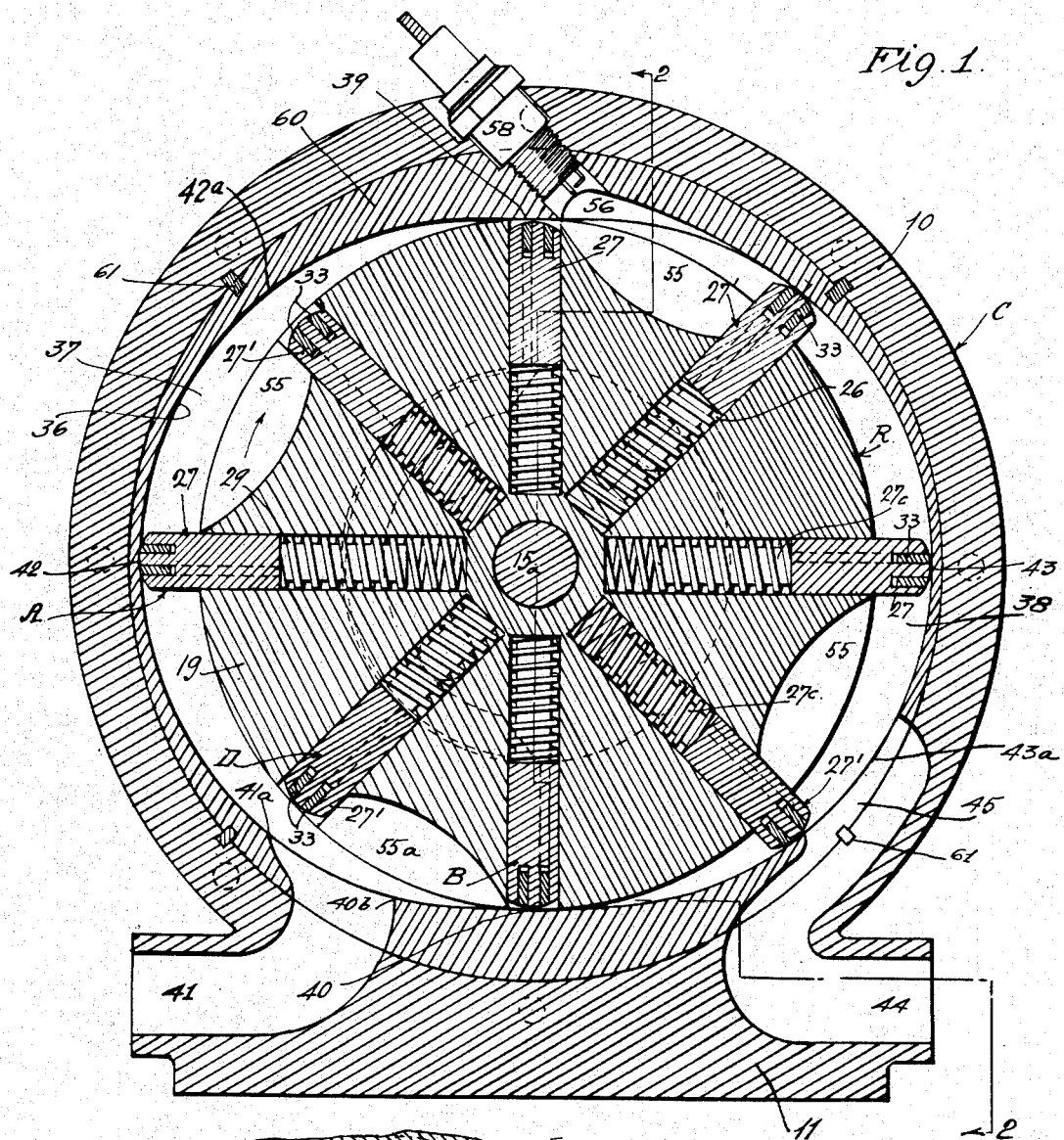
Fig. 1 is a medial section through the engine taken on line 1—1 of Fig. 2.

Referring to the drawings, the rotor casing C comprises a cylindrical shell 10 having an integral base portion 11, and a pair of end closures or plates 12 and 13 secured to the shell by screws 14. The engine rotor, generally indicated at R, is carried on shaft 15 journaled in bearings 16, 16a, which are placed within annular recesses 17 formed in the casing end plates. The body of the rotor comprises a fly-wheel 19 having a general cylindrical shape, mounted on enlarged portion 15a of the shaft, the fly-wheel being secured to the shaft flange 15b by means of screws 20, and to ring 22 keyed to the opposite end of the enlarged portion 15a of the shaft, by means of screws 21. The heads of the screws are countersunk in the outer faces of flange 15b and ring 22, as indicated.

Figure 2:
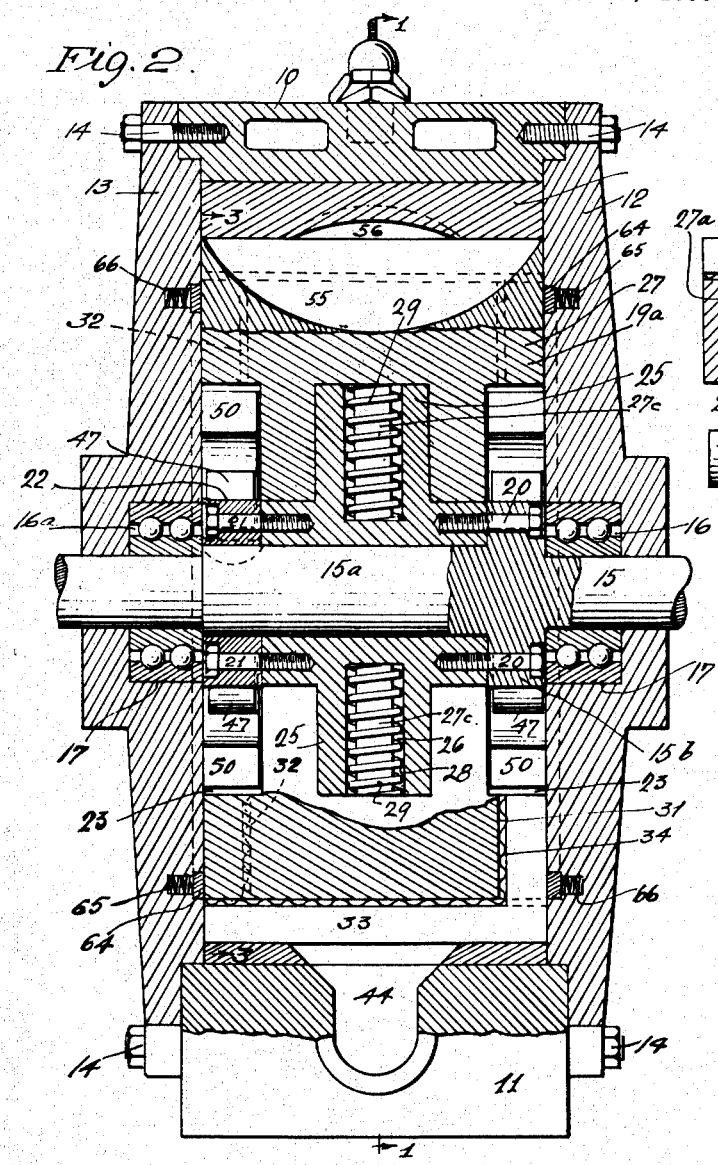
Fig. 2 is a sectional view on broken line 2—2 of Fig. 1, parts of the rotor blades being shown in elevation.
Figure 5:
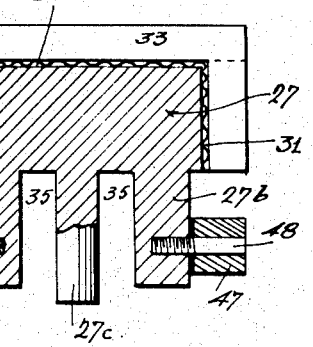
Fig. 5 is a sectional view of one of the rotor blades, the section being taken as on line 5—5 indicated in Fig. 3.
Figure 4:
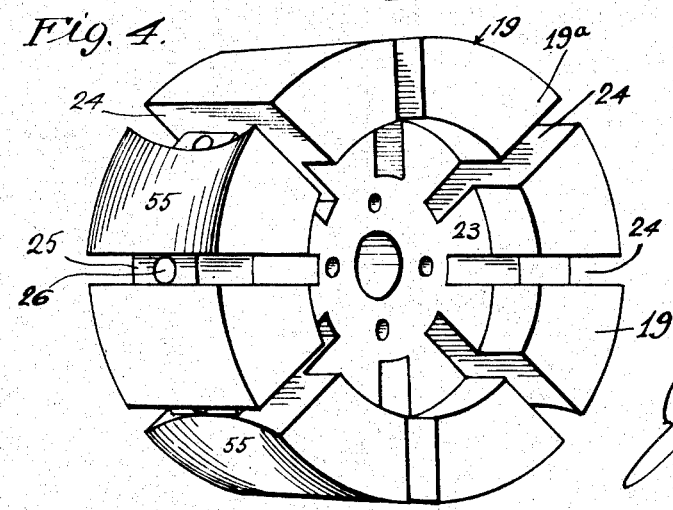
Fig. 4 is a perspective view of the fly-wheel or rotor body.

The fly-wheel is shaped to provide flange portions 19a, within which are formed annular spaces 23 between the fly-wheel and the end plates of the casing. The ends of the rotor, that is the end faces of flanges 19a, have a fairly close fit with the casing end plates in order to prevent leakage around the rotor during compression and firing of the charge, as will be more fully explained later. A plurality of radial slots 24 are formed in the fly-wheel, preferably at equal angular intervals, the slots extending through the flange portions 19a and radially inward at opposite sides of web portions 25 at the base of the slots. Within each of the radial slots 24 is carried a blade 27, the shape of the blades corresponding to the cross section of the fly-wheel, as shown in Figs. 2 and 5, that is, the width of the outer portions 27a of the blades being substantially equal to that of the flange portion 19a of the fly-wheel, and the inner portions 27b of the blades having the same width as the section of the flywheel between the annular spaces 23. The blades preferably have a close sliding fit within radial slots 24 in order to prevent leakage therebetween, during compression and firing. Each of blades 27 has an integral shank 27c inserted in a radial bore 26 drilled in web portion 25 of the fly-wheel, there being sufficient clearance at 28 between the shank and the bore wall to permit the insertion of a coil spring 29 which serves to thrust the blade radially outward against the inner peripheral wall of the casing. The width of slots 35 at opposite sides of the shank 27c preferably is just sufficient to take the webs 25.

A pair of parallel grooves 30 are formed longitudinally in the outer ends of blades 27, each of the end grooves continuing respectively in grooves 31 and 32 formed in the opposite sides of the blade. Within each end groove 30 and its corresponding side groove is an angle-shaped seal leaf 33, and between the inner sides of the leaves and the base of the grooves are placed marcel springs 34. Thus by providing for each blade, two separate leaves extending on opposite sides of the rotor and each capable of individual lateral movement relative to the blade by the action of the marcel springs, an effective seal is provided between the edges of the blade and the casing. The ends of the rotor preferably are sealed to prevent leakage from the compression spaces around the periphery of the rotor into annular spaces 23, by means of rings 64 pressed against the ends of the rotor by means of coil springs 65 seated within bores 66 in the casing end plates.

Referring now to Fig. 1, it will be seen that the inner peripheral wall 36 of the casing is shaped to provide crescent-shaped clearance spaces 37 and 38 at opposite sides of the fly wheel, the wall of the casing forming abutments at 39 and 40, preferably at substantially diametrically opposed points, which seal off spaces 37 and 38 and prevent the escape of gases from one to the other except by way of the rotor chambers, as will be described later. The fuel charge is taken into space 37 for compression from inlet 41 opening into the space near its lower end, the mouth of the inlet within the interior of the casing terminating at a point 41a angularly spaced substantially equidistant from the center of abutment 40, or the point of engagement of the fly wheel therewith, and from point 42 indicating the midpoint or point of greatest width of compression space 37. Fuel may be supplied to the inlet from any suitable source, for instance a carburetor, supercharger, or the like, as will be readily understood. Outlet 44 leads from space 38 at the bottom thereof, the mouth of the outlet within the casing being formed by a channel 45 cut in the inner wall thereof from point 43, identified hereinafter.

Figure 3:
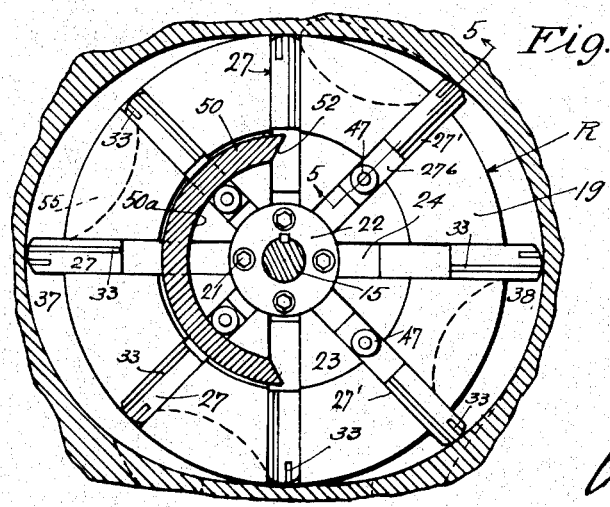
Fig. 3 is a fragmentary reduced view on line 3—3 of Fig. 2, showing the rotor in end elevation.

As mentioned preliminarily hereinabove, alternate rotor blades are held in retracted positions from the inner wall of the casing during their travel within the compression space, so as to permit the intake of fuel to the space between extended alternate blades, and are thereafter released, after transfer of the compressed charge to the expansion space, so as to confine the charge during expansion to the space between successive blades. As a preferred means for controlling the radial movement of alternate blades in this manner, I provide rollers 47 carried on pins 48 threaded in opposite sides of the inner portions 27b of alternate blades 27', the rollers being contained within the annular spaces 23 at opposite ends of the fly wheel. Each of the casing cover plates 12 and 13 has an integral substantially semicircular flange 50 projecting from its inner face within annular spaces 23, there being sufficient clearance between the inner faces 50a of flanges 50 and the rotor shaft to permit the travel of rollers 47 therethrough. As shown in Figs. 1 and 3, flanges 50 terminate at points in alinement at the centers of abutments 39 and 40, the ends of the flanges preferably being beveled somewhat as at 52. Flanges 50 thus have substantially the same angular extent as compression space 37.

It will be noted that as the rotor revolves, the blades, following the inner peripheral wall of the casing, are caused to move radially inward and outward between the limits of points 42 and 43 of greatest clearance from the rotor, and the midpoints of the abutments at which the rotor is substantially in engagement therewith. When the alternate blades 27' carrying the laterally projecting rollers 47 have moved to their inner radial positions at the end of their travel through space 38, assuming the rotor to revolve in a clockwise direction as viewed in Fig. 1, and as the blades move past abutment 40, rollers 47 are brought into engagement with flanges 50 and are caused to ride the inner faces 50a thereof to the upper end of the flanges, at which point the ends of the roller carrying blades are brought to engage abutments 39. Thereupon the rollers ride off the flanges and are released so as to permit the blades to move radially outward and follow the casing wall during their travel through space 38. It will be understood that in the inner radial positions of the blades to which they are moved upon traveling past abutments 40, rollers 47 are moved inward sufficiently far that there is no cam action on the part of flanges 50 tending by engagement with the rollers to move the blades further inward, since such action would result in destructive impact of the rollers against the ends of the flanges. The flanges instead serve merely to hold the blades in their retracted positions to which they are moved by engagement with the casing. Thus alternate blades 27' are retained in their inner positions, entirely within the rotor, throughout their travel from abutments 40 to 39, and are released at the point of movement past the latter abutment.

Compression chambers 55 are formed in the periphery of the rotor between alternate pairs of blades, these chambers being formed by recessing the rotor from the outer ends of slots 24 carrying the compression blades 27, preferably to an extent such as to intersect the slots containing the roller carrying blades. As shown in Fig. 1, a firing chamber 56 is recessed in the inner surface of the casing adjacent abutment 39, the compressed fuel charges being ignited in chamber 56 by means of spark plug 58.

The operation of the engine is as follows.

Assume a cycle to begin with blade A just leaving the edge 41a of intake 41 and turning clockwise. When blade A moves from 41a to the mid-point 42, a volume is swept through equal to the area of clearance space 37 included between 41a and 42 for each unit of axial length of the engine. During this period the next succeeding blade D travels from contact point 40 to point 41a and brings the volume of rotor chamber 55a into space 37. Hence, the net suction volume produced by the first 45 degree revolution of blade A is equal to the total volume from 41a to 42, minus the volume from 40 to 41a and the volume of chamber 55A.

For the next 45 degrees of motion, blade A increases the previous suction volume from point 42 to point 42a, equal to the area of the crescent from midpoint 42 to three-quarter point 42a. Meantime, the next succeeding active blade B has swept through the first quarter of the crescent, the blade D between them having no effect as it does not contact with the casing wall. Hence, the net increase in volume for blade A at point 42a, is equal to the crescent volume from midpoint to the three-quarter point, minus the crescent volume from zero to first quarter point. When blade A reaches point 42a, blade B has reached the terminal edge 41a of the intake, so that blade A can not draw further working fluid into space 37. Hence, the total net displacement volume of blade A has been that of the entire crescent, minus the volume of two one-quarter crescent ends and of one rotor chamber. These conditions fix the quantity of working fluid drawn into the engine for each revolution of each unretracted blade. Consider now the compression of the gas ahead of blade A drawn in by the blade ahead of blade A. As blade A passes the edge of the intake at 41a, compression of the gas in space 37 begins, and continues until the forward edge of compression chamber 55, just in advance of blade A, reaches upper contact point 39. This condition is reached approximately at the instant when the retracted blade in advance of blade A has just passed point 39. The net volume occupied by the compressed gas is about one end-quarter of the crescent volume, plus the rotor chamber volume. As has been shown, the initial volume, with the gas slightly below atmospheric pressure, was equal to the entire crescent volume less two end-quarters of the crescent, and the rotor chamber volume, or as graphically depicted in the drawing, Fig. 1, equal to the crescent volume from 41a to 42a less the rotor chamber volume. This amount of gas is compressed into the volume of one quarter-end of the crescent plus the volume of a rotor chamber. Obviously, the compressed gas can not be ignited until blade A reaches upper contact point 39, otherwise torques would be set up in both directions practically neutralizing each other. When blade A reaches point 39, a pressure set up in space 38 adjacent point 39 can not have any tangential component backward or in a counter-clockwise direction. When blade A reaches point 39, all of the previously compressed gas is in crescent 38. If the next blade were 90 degrees in advance of blade A, the gas would occupy the volume equal to half the crescent plus a rotor chamber, or nearly the original suction volume. However, the previously retracted and idle blades are released on the right hand side in space 38, and their ends contact with the casing and make seals therewith at 45 degree angular intervals, as shown. Hence, instead of the compressed gases expanding into the space from top contact point 39 to midpoint 43 of space 38, it is sealed by the blade just 45 degrees in advance of the contact point 39, so that the volume of gas at the instant of firing is equal to the volume of a rotor chamber plus the quarter of the crescent from zero to the 45 degree point; a volume much less than that of the suction volume included between two blades 90 degrees apart and previously described, so that by retracting alternate blades on the intake and compression side and permitting them to subdivide the arcuate space on the firing and expansion side, a practical rotary internal combustion engine, having considerable initial compression, is produced. When the gas is ignited the expansive force acts tangentially against the portion of the blade in advance of the firing space, the reaction being against the inwardly projecting portion of the casing just behind the spark plug, thereby producing a clockwise rotor torque. This general theory has been thoroughly tested in an operating machine and the observed facts confirm the theory.

In order to enable the compression ratio of the engine to be varied without necessitating substitution of the entire rotor casing, or of another rotor in which the size of the compression chambers is varied, it may be desired to provide a separate liner 60 secured within the casing by means of keys 61, the liner having predetermined clearances at 37 and 38 in accordance with the desired operating conditions. Thus if it is desired to vary the compression ratio in the engine, this may readily be done simply by removing the liner and inserting another having the required clearances.

It may be mentioned that the illustrated embodiment of my invention corresponds, to a two cycle, four cylinder engine; compression, firing and exhaust of the fuel charges occurring respectively in each of the four compression chambers 55, during one revolution of the rotor each. Although for purposes of illustration I have shown the rotor to have four of these compression chambers and a corresponding number of each of the compression and roller carrying blades, it will be understood that the number of chambers and blades may be varied as desired in accordance with the required power and size of the engine.

It will be understood the drawings and description are to be considered merely as illustrative of and not restrictive on the broader claims appended hereto, for various changes in design, structure and arrangement may be made without departing from the spirit and scope of said claims.

I claim:

1. In a mechanism of the character described, a casing and a cylindrical rotor within the casing, there being clearance spaces between said rotor and the inner peripheral wall of the casing, the wall of the casing forming an abutment between said spaces, a plurality of radially movable blades mounted on said rotor, means urging all of said blades radially outward, said blades engaging the inner peripheral wall of the casing during their movement toward said abutment, and means for holding alternate blades in retracted positions from said inner wall of the casing, during their travel away from said abutment.

2. In a mechanism of the character described, a casing and a cylindrical rotor within the casing, there being compression and expansion spaces around opposite peripheral sides of the rotor, the wall of the casing forming a pair of abutments between said spaces, a plurality of radially movable blades mounted on said rotor, means urging all of said blades radially outward, said blades being adapted to engage the inner peripheral wall of the casing between abutments during their movement through one of said spaces, and means for holding alternate blades in retracted positions from said inner wall of the casing, during their travel between abutments and through the other of said spaces.

3. In a mechanism of the character described, a casing and a cylindrical rotor within the casing, there being compression and expansion spaces around opposite peripheral sides of the rotor, the wall of the casing forming a pair of abutments between said spaces, an inlet and an outlet opening respectively into said spaces at opposite sides of one of said abutments, a plurality of radially movable blades mounted on said rotor, yielding means urging all of said blades radially outward, said blades engaging the inner peripheral wall of the casing between abutments during their movement through one of said spaces, means for holding alternate blades in retracted positions from said inner wall of the casing, during their travel between abutments and through the other of said spaces, and a plurality of compression chambers formed in the periphery of said rotor between alternate pairs of blades, respectively.

4. In a mechanism of the character described, a casing comprising a cylindrical shell and end closures for said shell, a rotor within the casing, there being compression and expansion spaces around opposite peripheral sides of the rotor, the wall of the casing forming a pair of abutments between said spaces, an inlet opening into said compression space and an outlet leading from said expansion space, a plurality of radially movable blades on said rotor all adapted to engage the inner peripheral wall of the casing during their movement through said expansion space, and means carried by one of said casing end closures for cooperation with alternate blades to hold such blades in retracted positions from said inner wall of the casing during their travel through said compression space.

5. In a mechanism of the character described, a casing comprising a cylindrical shell and end closures for said shell, a rotor within the casing, there being compression and expansion spaces around opposite peripheral sides of the rotor, the wall of the casing forming a pair of abutments between said spaces, an inlet opening into said compression space and an outlet leading from said expansion space, a plurality of radially movable blades on said rotor all adapted to engage the inner peripheral wall of the casing during their movement through said expansion space, and means carried by one of said casing end closures for cooperation with alternate blades to hold such blades in retracted positions from said inner wall of the casing during their travel through said compression space, said means comprising an internal segmental circular flange on said casing end closures alternate blades having rollers for engagement with said flanges.

6. A rotary internal combustion engine comprising a casing, a cylindrical rotor therein, the inner periphery of the casing having portions eccentric to the rotor providing compression and expansion chambers, the casing having inlet and exhaust ports communicating with said chambers respectively, abutments between said chambers engaged by the periphery of the rotor, a plurality of radially movable blades carried by the rotor, cam followers carried by alternate of said blades, cam means fixed with respect to the casing and cooperating with said cam followers to hold alternate of said blades retracted from the peripheral wall of the casing during travel of said blades through the compression chamber, the remaining blades being free to move radially outward into engagement with said wall during their travel through said compression chamber, and all of said blades being free to move radially outward into engagement with the peripheral wall of the casing during their travel through the expansion chamber.

7. A rotary internal combustion engine comprising a casing, a cylindrical rotor therein, the inner periphery of the casing having opposed portions eccentric to the rotor providing a compression chamber and an expansion chamber, respectively, abutments between the ends of said chambers engaged by the periphery of the rotor, the casing having inlet and exhaust ports communicating with said chambers, respectively, a plurality of radially movable blades carried by the rotor, cam followers carried by alternate of said blades, cam means fixed with respect to said casing and extending approximately coextensively with the compression chamber for cooperation with said cam followers to hold alternate blades retracted from the peripheral wall of the casing during travel of said blades through the compression chamber, the remaining blades being free to move radially outward into engagement with said wall during their travel through said compression chamber, and all of said blades being free to move radially outward into engagement with the peripheral wall of the casing during their travel through the expansion chamber.

DIMITRI N. HAPKINS.